United States Patent [19]
Wolf

[11] Patent Number: 5,946,377
[45] Date of Patent: Aug. 31, 1999

[54] SCRIPT-BASED DTMF INFORMATION RETRIEVAL SYSTEM

[75] Inventor: Richard J. Wolf, Crowley, Tex.

[73] Assignee: AST Research, Inc., Irvine, Calif.

[21] Appl. No.: 08/541,434

[22] Filed: Oct. 10, 1995

[51] Int. Cl.⁶ .................................................. H04M 3/42
[52] U.S. Cl. ...................................... 379/88.22; 379/355
[58] Field of Search .................................. 379/67, 83, 89,
379/91, 96, 102, 200, 201, 216, 350, 352,
355, 67.1, 88.11, 88.18, 88.22, 102.01;
345/116; 395/326, 347, 348

[56] References Cited

U.S. PATENT DOCUMENTS

| | | | |
|---|---|---|---|
| 4,755,932 | 7/1988 | Diedrich | 364/200 |
| 4,964,156 | 10/1990 | Blair | 379/189 |
| 5,182,766 | 1/1993 | Garland | 379/216 |
| 5,455,858 | 10/1995 | Lin | 379/355 |
| 5,509,056 | 4/1996 | Ericsson et al. | 379/144 |
| 5,561,705 | 10/1996 | Allard et al. | 379/58 |
| 5,592,538 | 1/1997 | Kosowsky et al. | 379/93 |

*Primary Examiner*—Scott Weaver
*Attorney, Agent, or Firm*—Knobbe, Martens, Olson & Bear, LLP

[57] ABSTRACT

User-customizable method and system for enabling a user easily and conveniently to navigate one or more IVR systems regularly accessed by the user are disclosed. In a preferred embodiment, a script-based DTMF information retrieval system of the present invention enables a user to build scripts that may be used to access information in an IVR system so that the need for remembering menu picks, account numbers and passwords is eliminated. Using the system of the present invention, a user may enter information about a service, such as the telephone number and name thereof. The user may then enter information about one or more accounts within each service, including account numbers and any passwords associated therewith. At that point, the user may construct scripts that can be used automatically to access information from or execute orders in connection with the service. Each script includes script records of various types depending on the type of action to be performed. In particular, each type of record has properties and methods that combine to perform the action that the user desires.

10 Claims, 10 Drawing Sheets

SCRIPT-BASED DTMF INFORMATION RETRIEVAL SYSTEM

TECHNICAL FIELD

The invention relates generally to interactive voice response ("IVR") systems and, more particularly, to a customizable system for interacting with and retrieving information from such IVR systems.

BACKGROUND OF THE INVENTION

Various types of interactive voice response ("IVR") systems are well known in the art and typically comprise some means for prompting a caller who has dialed into the system to enter information and/or questions, often in response to a menu of voice prompts issued via the handset of the caller's telephone, wherein caller entries generally consist of DTMF key tones generated using the keypad of the caller's telephone. For example, the caller may be prompted to enter a "1" to inquire about an account balance, a "2" to speak to a customer service representative, or a "0" to speak to the operator. Assuming the caller enters a "1" in response to the first series of prompts, the caller may be prompted to enter his or her account number and perhaps an associated password, at which point, the system will determine the balance of the account associated with the entered account number and announce same to the caller.

For obvious reasons, IVR systems are widely used in customer service, order status inquiry, banking and financial transaction, voice mail and other applications. Unfortunately, access to information via IVR systems in the above-described manner is somewhat complicated by the fact that the caller is required to remember a number of access phone numbers, account numbers, passwords, and reasonably complicated nested menu structures. Audible instructions typically are provided for guiding the user through the maze of options, but the issuance of such instructions takes up considerable time and places on the caller the burden of remembering options at a particular menu level until the instructions at that level are completed, so that the most appropriate response can be entered.

Moreover, assuming that the caller is familiar enough with the particular IVR system he is using that he has memorized the series of entries he will need to make in order to access the information he is seeking, the user must still manually depress a series of DTMF keys on his telephone, typically corresponding to a series of menu selections, account numbers and passwords, resulting in a number of DTMF "keystrokes" that must be made manually. Again, this is time consuming and inconvenient to a user who wants to access the same or similar information multiple times.

Therefore, what is needed is a system for enabling a caller easily and conveniently to navigate IVR systems that he commonly accesses.

SUMMARY OF THE INVENTION

The present invention, accordingly, provides a user-customizable method and system for enabling a user easily and conveniently to navigate one or more IVR systems regularly accessed by the user that overcome or reduce disadvantages and limitations associated with prior methods and systems.

In a preferred embodiment, a script-based DTMF information retrieval system of the present invention enables a user to build scripts that may be used to access information in an IVR system so that the burden of remembering menu picks, account numbers and passwords is removed. Using the system of the present invention, a user may enter information about a service, such as the telephone number and name thereof. The user may then enter information about one or more accounts within each service, including account numbers and any passwords associated therewith. At that point, the user may construct scripts that can be used automatically to access the information or execute orders. Each script includes script records of various types depending on the type of action to be performed. In particular, each type of record has properties and methods that combine to perform the action that the user desires.

In one aspect of the invention, the system comprises an engine, one or more service records, a script editing mechanism, and script record implementations. Each of the service records potentially comprises one or more account records, each of which potentially comprises one or more scripts. The engine manages a voice-capable modem or other capable equipment and performs functions on behalf of the script records relating to telephone line management. Such functions may include, for example, dialing a number, sending DTMF key tone(s), hanging up, and other functions such as recording or playing audio information to/from the telephone line. The engine uses standard components, such as Microsoft/Intel TAPI and Microsoft multimedia capabilities, to implement the fundamental aspects of these commands. The script mechanism provides control functions so that each record is played in turn. The individual script records provide various functions that can easily be extended as new capabilities are desired.

In operation, when a script is activated, the script requests each record to queue events. These events may include, for example, wait for a dialtone, dial the appropriate telephone number, and then wait for an answer, play a greeting to the telephone line and optionally request and verify a password, which is input by the caller via the keypad of the telephone. The menu then requests each record to queue events. The engine then processes the event queue. This continues until the caller hangs up or a record is invoked that terminates the call.

In another aspect of the invention, the script engine is connected to a script editing mechanism that allows the user to create new scripts, add script records from the available inventory of record types and change the properties of existing script records quickly and easily via a series of graphical user interface screens and dialog boxes designed for that purpose.

A technical advantage achieved with the invention is that it provides a way for users easily and conveniently to navigate one or more IVR systems to retrieve commonly accessed information without having to remember a series of menu selections, account numbers and passwords to do so.

Another technical advantage achieved with the invention is that it provides a means by which a user can navigate an IVR system without manually entering DTMF keystrokes to do so.

Another technical advantage achieved with the invention is that it is easily customizable, so that a user may add and/or delete scripts for accessing different items of information from different IVR systems or may access more than one item of information from a single IVR system during a single telephone call.

Yet another technical advantage achieved with the invention is that it enables the IVR response to be recorded in digital format so that the information may be archived or later reviewed. Accordingly, scripts can be created that retrieve information at night or on a periodic basis and the information can be reviewed later at the user's convenience.

Still another technical advantage achieved with the invention is that it allows certain alphanumeric information to be entered via normal keyboard techniques rather than as a sequence of DTMF keys. For example, stock quotation services commonly encode alphabetic information as a sequence of keys, the first being the common telephone keypad associated with that key and the second being the position on the key. The present invention enables the user simply to enter the alphabetic information and then translates that information into the equivalent DTMF key tones.

DESCRIPTION OF THE PREFERRED EMBODIMENTS

Figure 1A:
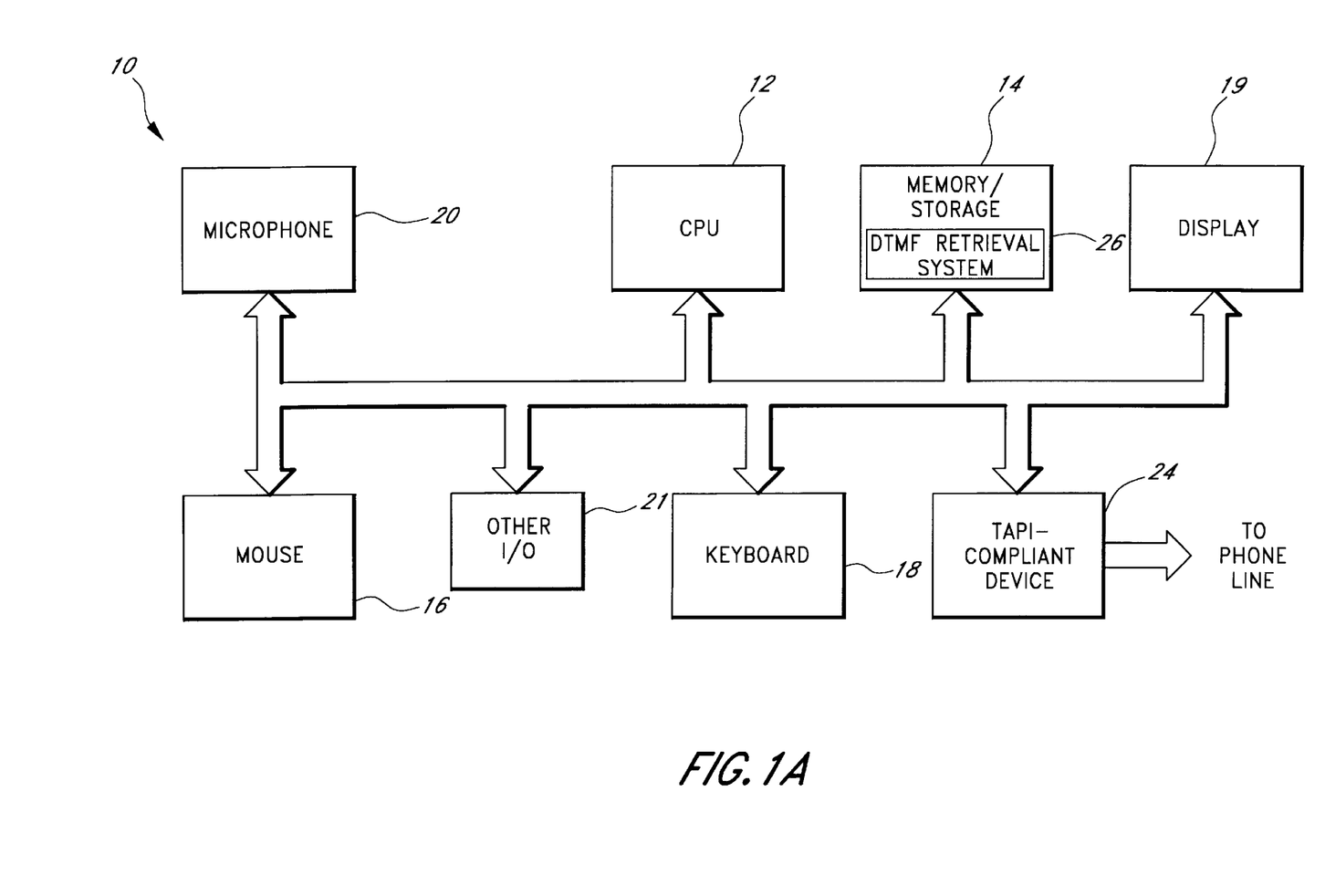
FIG. 1A is a system block diagram of a personal computer ("PC") embodying features of the present invention.

FIG. 1A illustrates a personal computer ("PC") 10 embodying features of the present invention. In particular, as shown in FIG. 1, the PC 10 comprises a central processing unit ("CPU") 12, memory and storage devices, collectively designated by a reference numeral 14, a mouse 16, a keyboard 18, a display 19, and a microphone 20 interconnected via one or more computer buses, shown in FIG. 1 as a bus 22. At least one Telephony Application Programming Interface ("TAPI") compliant device 24 is provided on the bus 22 for connecting the components of the PC 10 to a telephone line (not shown) and for providing the PC 10 with standard telephone capabilities. It will be recognized by those skilled in the art that "TAPI," which was jointly developed by Microsoft Corporation of Redmond, Washington, and Intel Corporation of Santa Clara, Calif., defines an interface between Microsoft Windows applications and telephone devices for providing a standard way to build telephone capabilities into Windows software. Alternatively, the device 24 may be a voice modem. As will be described, instructions for implementing a script-based DTMF information retrieval system 26 embodying features of the present invention are stored in the memory/storage device 14 for execution by the CPU 12.

Figure 1B:
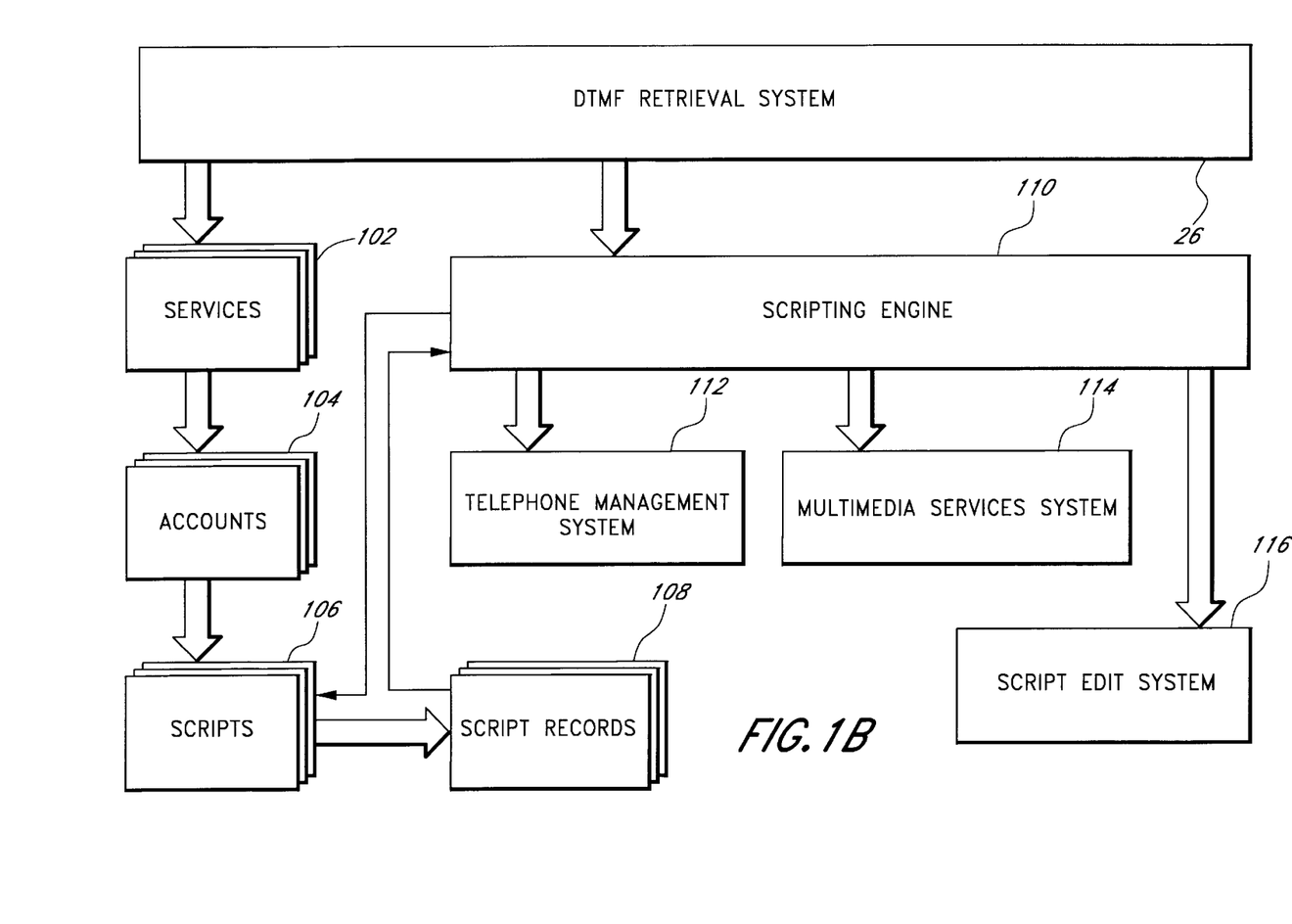
FIG. 1B is a conceptual block diagram of the information retrieval system of the present invention.

FIG. 1B is a conceptual block diagram of the system 26 shown in FIG. 1A. In particular, the system 26 comprises a plurality of services 102, each of which comprises a plurality of accounts 104, each of which in turn comprises a plurality of scripts 106 comprising script records 108. The system further comprises a scripting engine 110 that includes a telephone management system 112 for managing the device 24, a multimedia services system 114 for enabling the user to play the telephone conversation through a speaker (not shown) on the PC and for enabling the IVR response to be recorded, and a script editing system 116 for enabling a user to add and delete scripts 106 and script records 108 from the system 26, as will be described. In the preferred embodiment, the multimedia services system 114 is implemented using Multimedia Control Interface ("MCI"), commercially available from Microsoft Corporation, Redmond, Wash. The multimedia services system 114 enables the invention to play sound from the device 24/telephone line through the computer's speakers. In addition, it enables the invention to record sound from the device 24/telephone line and to play recorded digital messages to the device 24/telephone line.

As used herein, a "service" is a record that contains information relating to a provider of an IVR system. A service record comprises the name and telephone number of the service, an icon for representing the service on the display 19 (see FIG. 2), and a comment. An "account" is a record that contains information about a particular service account. An account record comprises the name, number and password of the account and a comment. A "script" typically comprises a "Dial" type record for dialing the telephone number from the associated service record, "Send the Account ID" type record for sending the account number from the associated account record, and a "Send Password" type record for sending the password from the associated account record.

In accordance with the features of the present invention, a user's use of the system 26 is facilitated by the use of a plurality of graphical user interface ("GUI") screens and dialog boxes for display on the display 19.

Figure 2:
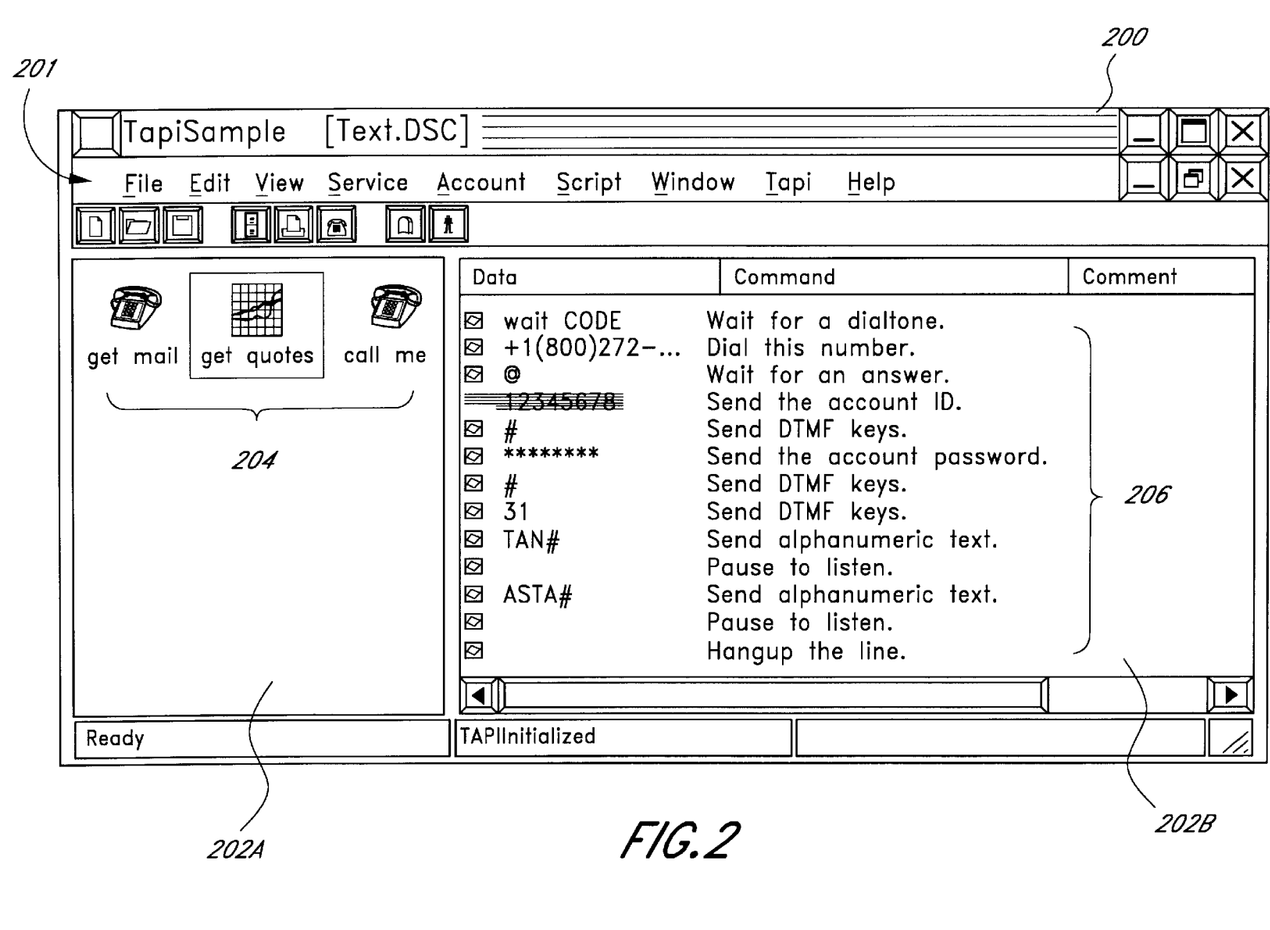
FIG. 2 illustrates a main screen of the user interface of the information retrieval system of the present invention.

FIG. 2 illustrates a main screen 200 comprising a menu bar 201, a script pane 202a and a records pane 202b. A plurality of script icons 204, in this case, a "GET MAIL" icon, a "GET QUOTES" icon and a "CALL ME" icon, are displayed in the script pane 202a. Upon selection of one of the script icons 204 displayed in the script portion 202a, a corresponding script for the selected script icon is displayed in the records pane 202b. As shown in FIG. 2, the GET QUOTES icon has been selected, resulting in the display in the records pane 202b of a script 206. Each line of the displayed script 206 comprises an individual script record and, for purposes to be described in detail below, each record of the script 206 includes a "Data" field, a "Command" field and a "Comment" field.

As will be described in detail below, using the information retrieval system 26 of the present invention, the user is able to create, modify, and delete entire scripts icons and their associated scripts, as well as one or more individual records within a script. As will be recognized, a user can create as many different menus and corresponding scripts as he desires. It should be noted that, as used herein, "menu" and "script" may be used interchangeably to refer to a set of individual records.

To create a new script, which will be represented by an icon similar to the icons 204 in the script pane 202a, the user selects "Service" from the menu bar 201 of the main screen 200, resulting in the display of a Service menu (not shown). From the Service menu, the user selects "New," resulting in the display of an "Edit Service" dialog box 300, shown in FIG. 3.

Figure 3:
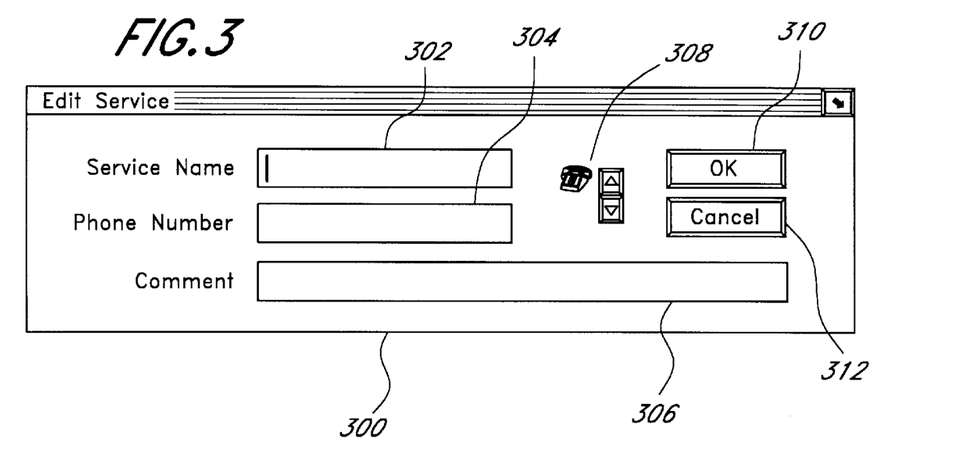
FIG. 3 illustrates an Edit Service dialog box of the user interface of the information retrieval system of the present invention.

Referring to FIG. 3, to add a service, the user simply types in the name and telephone number of the service in "Service Name" and "Phone Number" fields 302, 304, respectively, and any comments in a "Comments" field 306. The user may also select an icon 308 for representing the service in the script pane 202a (FIG. 2). If the user is satisfied that the information entered in the dialog box 300 is accurate, he clicks on an "OK" button 310 to create the service. Otherwise, he may click on a "Cancel" button 312 to cancel the entries.

Figure 4:
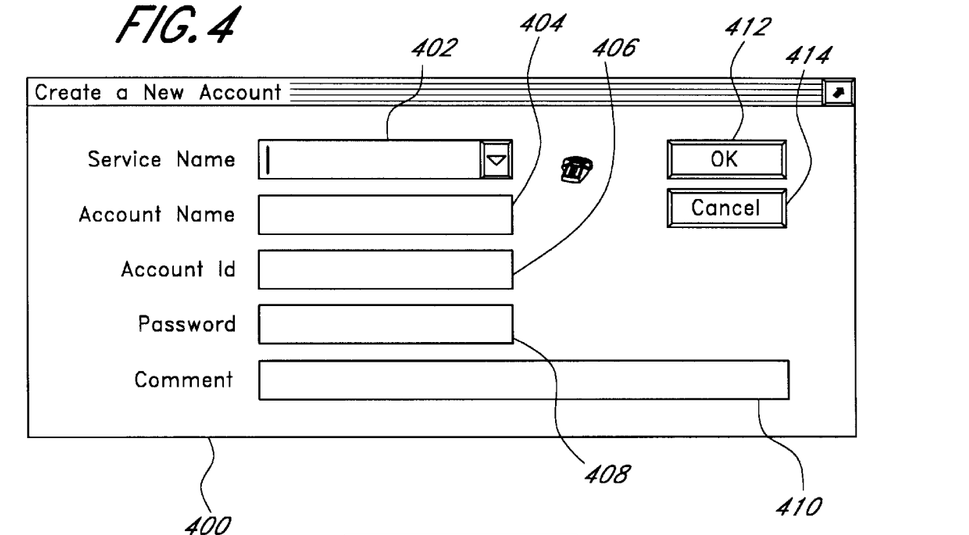
FIG. 4 illustrates a New Account dialog box of the user interface of the information retrieval system of the present invention.

Similarly, as shown in FIG. 4, to add a new account to a service, the user selects "Account" from the menu bar 201 (FIG. 2) and then selects "New" from the Account submenu (not shown), resulting in the display of a "Create a New Account" dialog box 400. To add an account, the user selects a service from a drop down menu (not shown) associated with a "Service Name" field 402, and enters the account name, ID, and password in the "Account Name," "Account ID," and "Password" fields 404, 406, 408, respectively, and any comments in a Comments field 410. Once the information has been entered, the user clicks on an "OK" button 412 to accept the information or a "Cancel" button 414 to cancel the account record.

Referring again to FIG. 2, once a script has been created, as described above with reference to FIG. 3, the user may create and add records to the script by selecting the icon associated with the script to be modified from the script pane 202a, which results in the script associated with the selected icon being displayed in the records pane 202b. At that point, the user may modify the script by positioning the cursor at the desired insertion point in the script displayed in the pane 202b, selecting "Script" from the menu bar of the main screen 200, and then selecting "Insert Record" from the Script menu (not shown), resulting in the display of an Insert Record submenu 500, as shown in FIG. 5.

Figure 5:
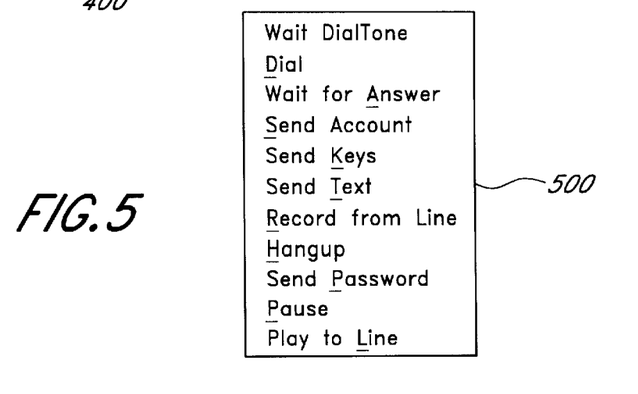
FIG. 5 illustrates an Insert Records submenu of the user interface of the information retrieval system of the present invention.

Referring to FIG. 5, the Insert Record submenu 500 comprises a series of menu picks, each associated with an available type of record. For example, in the current embodiment, there are eleven (11) types of script records, including a "Wait Dial Tone" type of record for causing the system 26 to await a dial tone on the telephone line, a "Dial" type of record for causing the system 26 to dial a designated telephone number, a "Wait for Answer" type of record for causing the system 26 to await an off hook condition on the telephone line, a "Send account ID" type of record for causing the system 26 to send a designated account ID, a "Send Keys" type of record for sending DTMF tones on the telephone line, "Send Text" type of record for sending alphanumeric text on the telephone line, a "Record from Line" type of record for recording the telephone conversation to the file named in the data field of the record, a "Hangup" type of record for terminating the connection, a "Send Password" type of record for sending a password associated with an account over the telephone line, a "Pause" type of record for implementing a pause in execution of the script, and a "Play to Line" type of record for playing the contents of the wave file identified in the data field of the record to the telephone line.

After a record type is selected from the Insert Record submenu 500 (FIG. 5), The user double clicks on the data field of the new record to open the field as a standard Windows edit field. It should be noted that some types of records, such as "Dial" and "Send Account ID," for example, cannot be edited, as they derive their information from the service record and/or account record with which they are associated.

Figure 6:
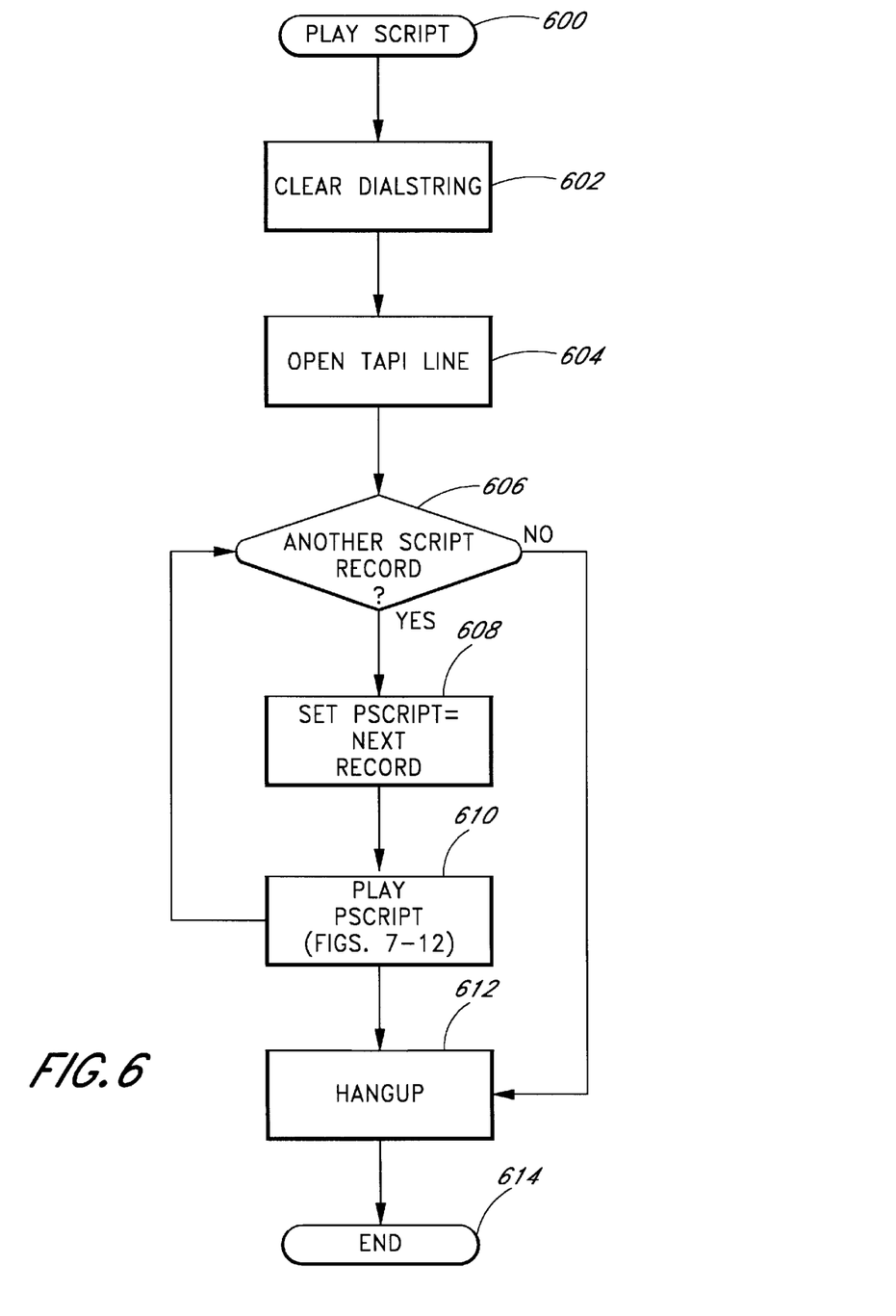
FIGS. 6–12 are flowcharts illustrating the operation of the information retrieval system of the present invention.
Figure 7:
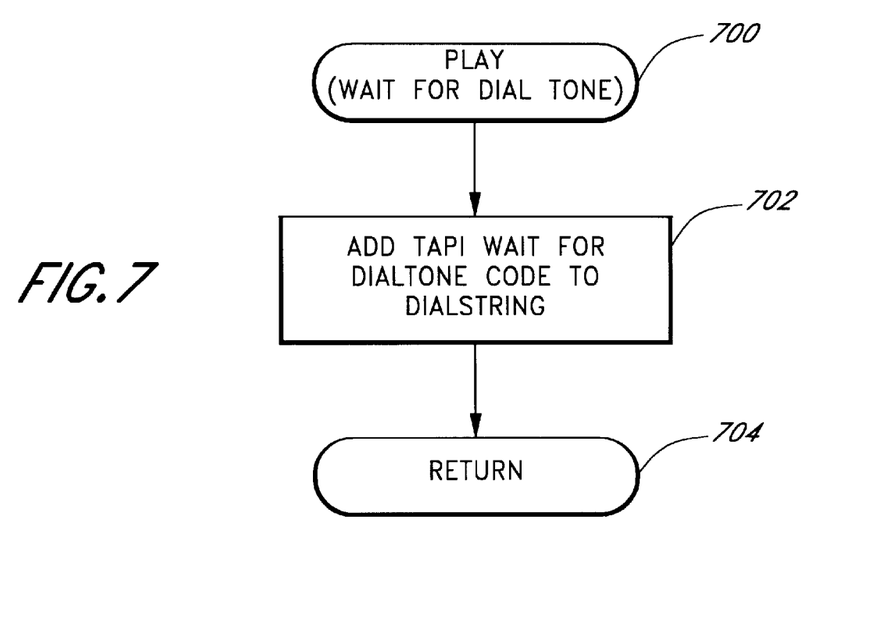

FIGS. 6–12 comprise flowcharts illustrating the operation of the information retrieval system of the present invention. Referring to FIG. 6, execution begins in step 600 when the user activates a script by selecting its icon from the script pane 202a (FIG. 2). In step 602, a "DialString," which is used to store all of the dial tones to be sent out on the telephone line, is cleared. In step 604, the device 26 line is opened in a known fashion. In step 606, a determination is made whether there are more script records in the active script. If so, execution proceeds to step 608, in which a variable, "PSCRIPT," is set to the next record. In step 610, the record identified by PSCRIPT is played. As will be described, the routine used to play the PSCRIPT record will depend on the type of record. For example, if the PSCRIPT record is a "Wait for Dial Tone" type record, execution proceeds to step 700 (FIG. 7). In step 702, a TAPI "wait for dialtone" code is added to the DialString, and in step 704, execution returns to step 610 (FIG. 6).

Figure 8:
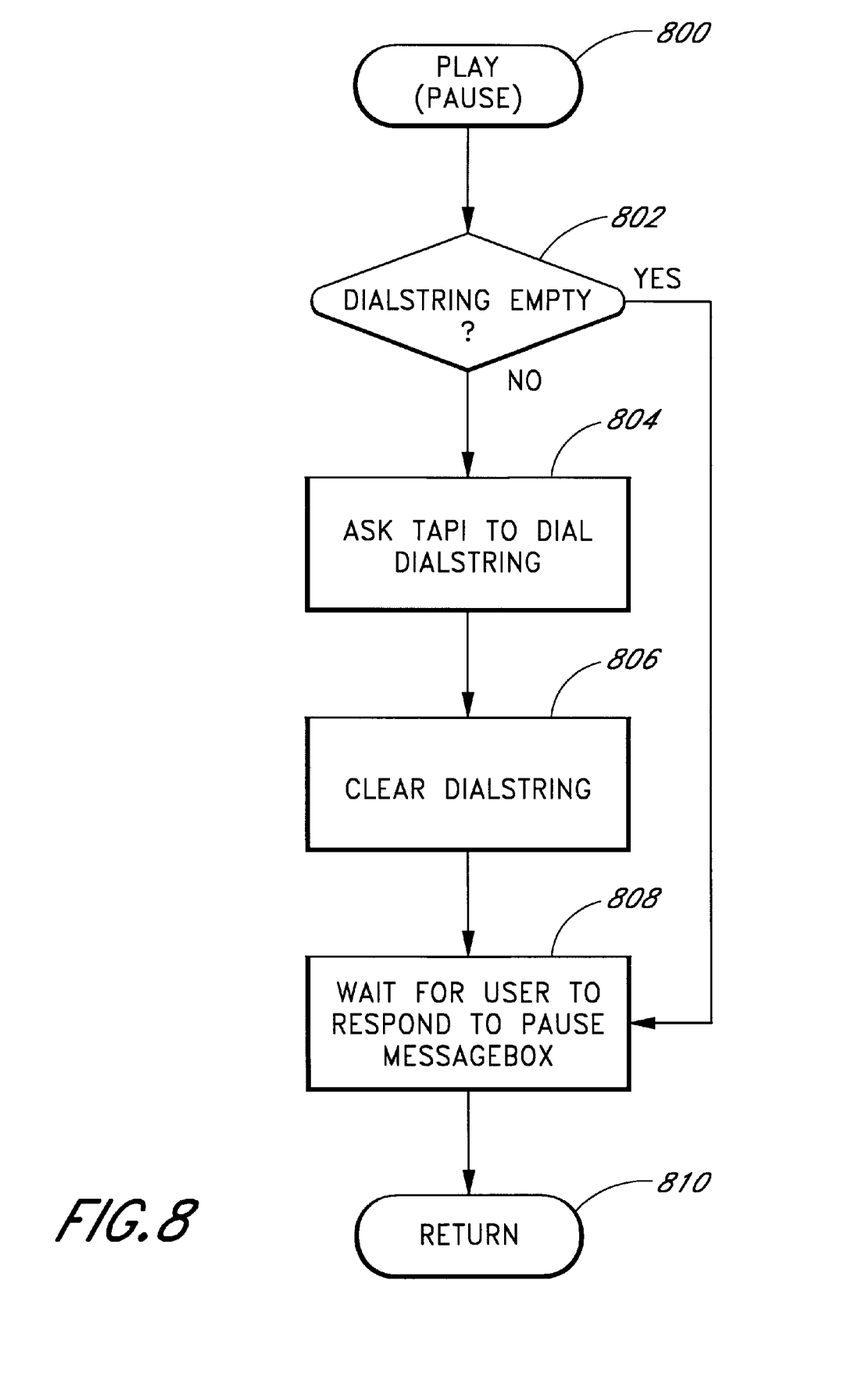

If the PSCRIPT record to be played is a "Pause" type record, execution proceeds to step 800 (FIG. 8). In step 802, a determination is made whether the DialString is empty. If not, execution proceeds to step 804, in which the device 26 is requested to dial the DialString. In step 806, the DialString is cleared. In step 808, a pause message box (not shown) is displayed on the display 19 and user response to the pause message is awaited. Appropriate user response to the pause message typically comprises clicking on a button of the pause message box when the user is ready to proceed. Alternatively, if in step 802 it is determined that the DialString is empty, execution proceeds to step 808. Execution returns to step 610 (FIG. 6) in step 810.

Figure 9:
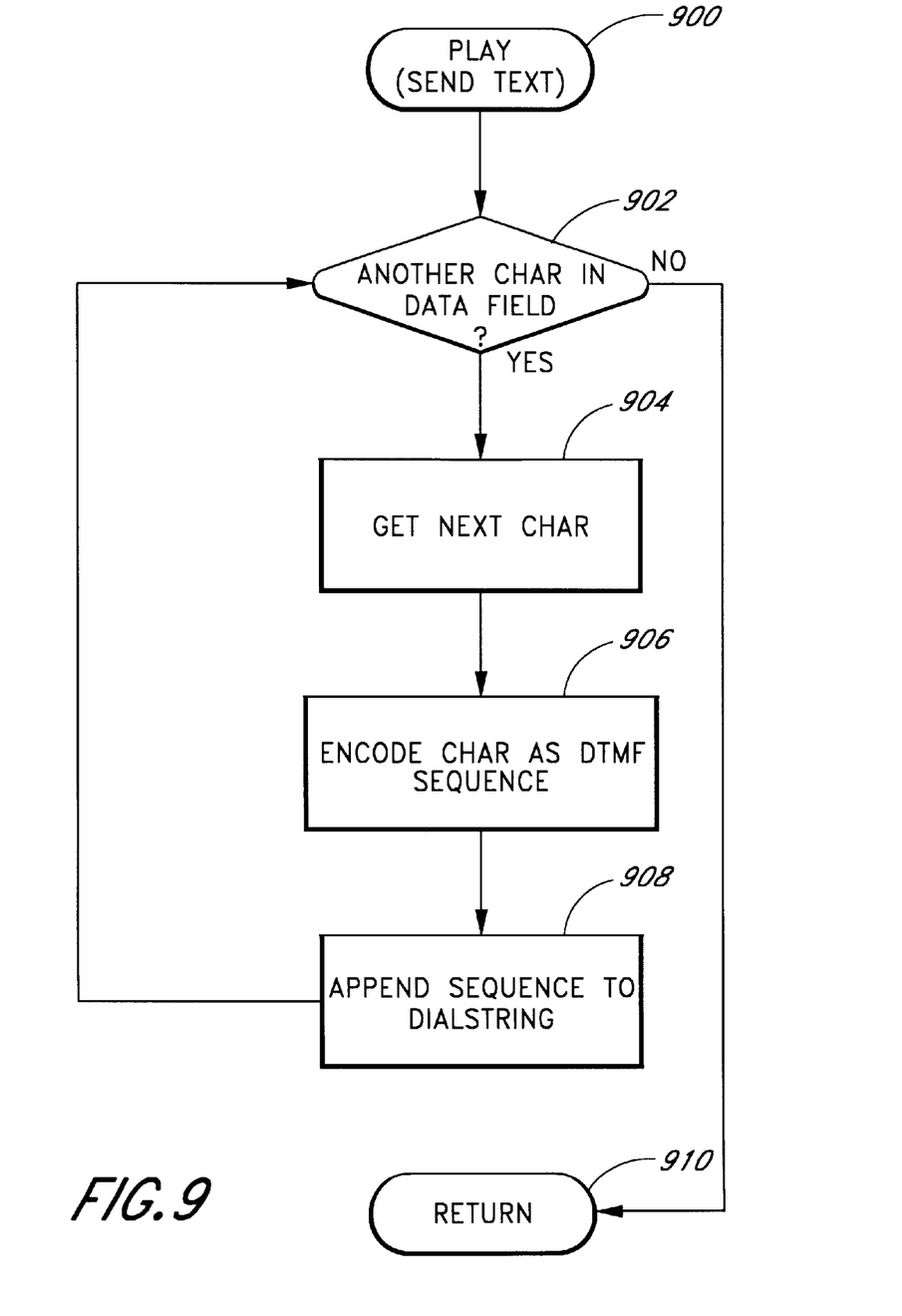

If the PSCRIPT record to be played is a "Send Text" type record, execution proceeds to step 900 (FIG. 9). In step 902, a determination is made whether there is another character in the data field of the PSCRIPT record. If so, execution proceeds to step 904, in which the next character is retrieved, and then to step 906, in which the character retrieved in step 906 is appropriately encoded. For example, in some services, each character of alphabetic information is encoded as a pair of DTMF tones, the first one being the key on which the letter is located and the second being the letter's position on that key. In such an encoding system, the code for an "A" would be "21," since "A" is the first letter on the key 2, whereas the code for an "S" would be "73," since "S" is the third letter on key 7. Once the character is encoded, its code sequence is appended to the end of the DialString in step 908. Execution then returns to step 902. If in step 902, there are no more characters in the data field, execution proceeds to step 910, in which execution returns to step 610 (FIG. 6).

Figure 10:
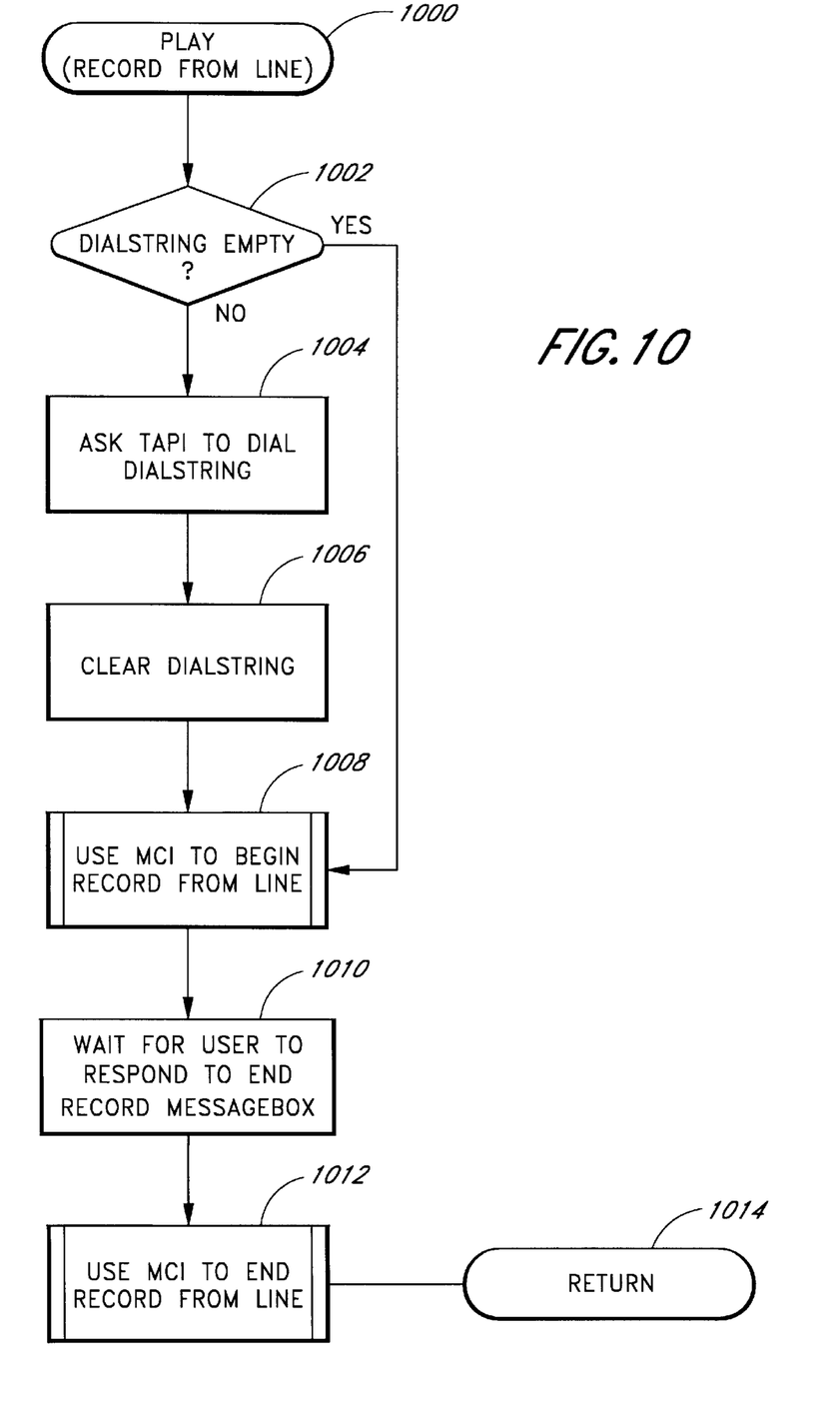

If the PSCRIPT record to be played is a "Record from Line" type record, execution proceeds to step 1000 (FIG. 10). In step 1002, a determination is made whether the DialString is empty. If not, execution proceeds to step 1004, in which the device 26 is requested to dial the DialString. In step 1006, the DialString is cleared and execution proceeds to step 1008. If in step 1002, the DialString is empty, execution proceeds directly to step 1008. In step 1008, a Windows service known as "Media Control Interface," or "MCI", begins to record the information being sent over the telephone line. In step 1010, an end record message box (not shown) is displayed and user response thereto, typically by clicking in a button therein, is awaited. Once the user responds to the end record messagebox, execution proceeds to step 1012, in which the MCI terminates the recording function. Execution returns to step 610 (FIG. 6) in step 1014.

Figure 11:
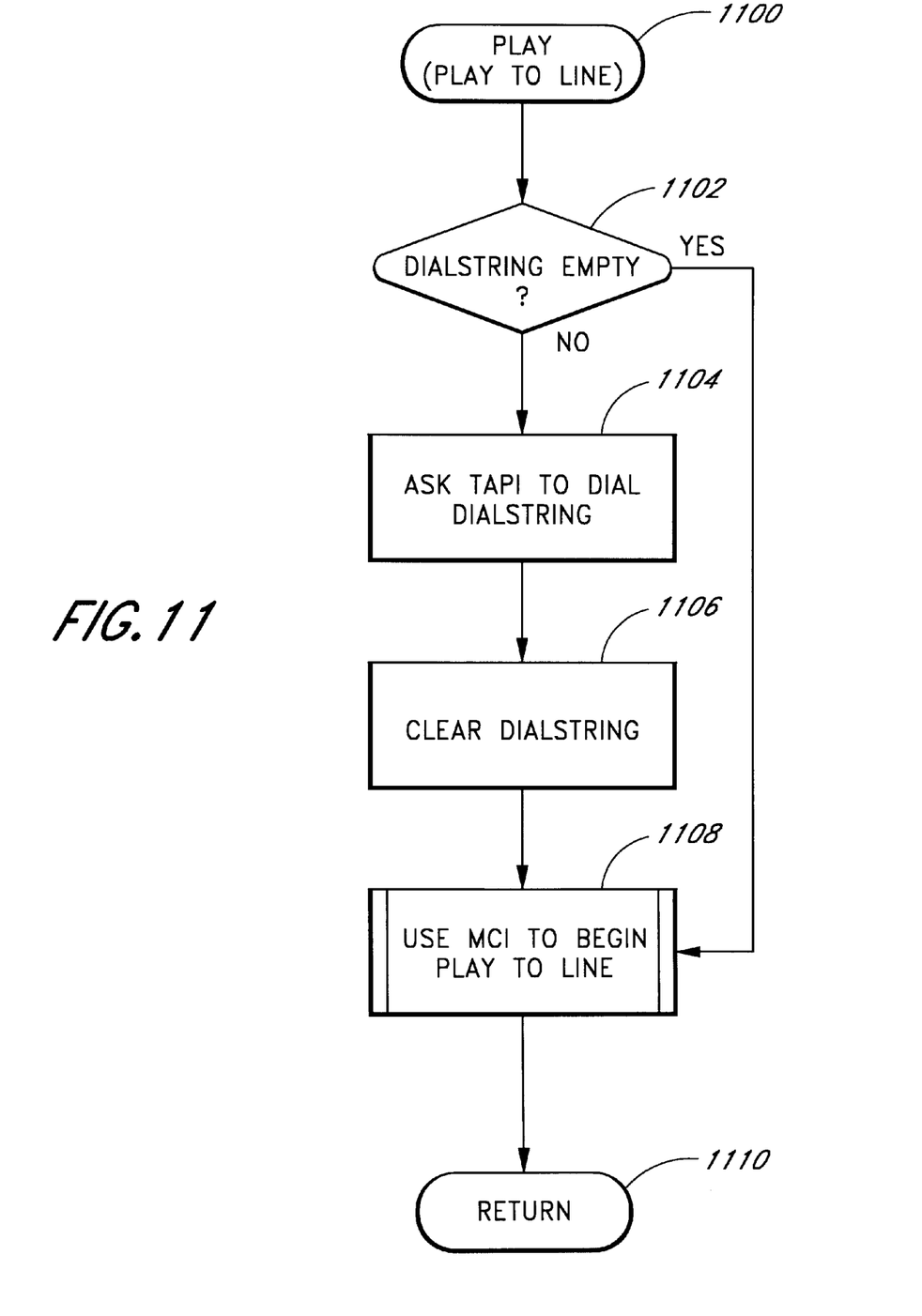

If the PSCRIPT record is a "Play to Line" type record, execution proceeds to step 1100 (FIG. 11). In step 1102, a determination is made whether the DialString is empty. If not, execution proceeds to step 1104, in which the device 26 is requested to dial the DialString. In step 1106, the Dial- String is cleared. Execution then proceeds to step 1108. Similarly, if in step 1102, the DialString is empty, execution proceeds directly to step 1108. In step 1108, the MCI begins to play the wave file identified by the data field to the telephone line. Once the MCI has finished playing the wave file to the line, execution returns to step 610 (FIG. 6) in step 1110.

Figure 12:
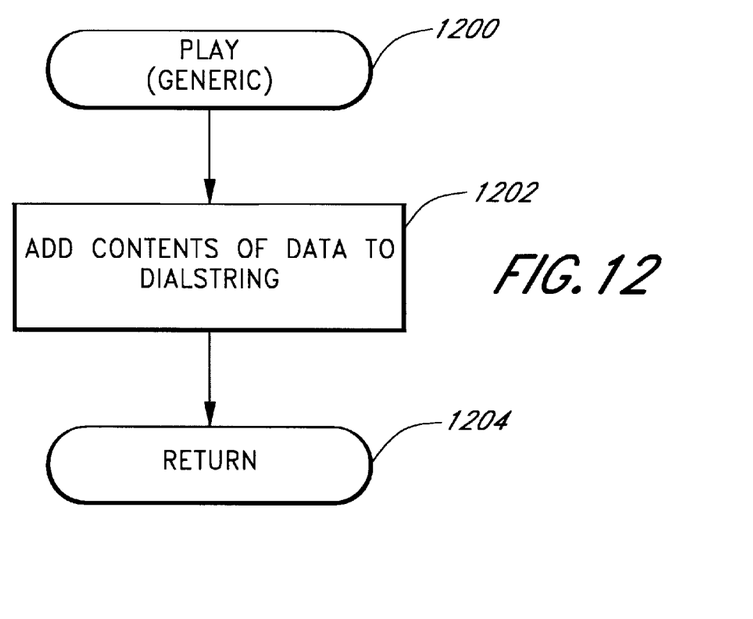

If the PSCRIPT record is none of the above types of records, execution proceeds to step 1200. In step 1202, the contents of the data field of the record are appended to DialString and in step 1204, execution returns to step 610 (FIG. 6).

Referring again to FIG. 6, once the appropriate "Play" routine has been executed, execution returns to step 606. If in step 606, there are no more script records, execution proceeds to step 612, in which the device 26 hangs up the line. Execution terminates in step 614.

It is understood that the present invention can take many forms and embodiments, the embodiments shown herein are intended to illustrate rather than limit, the invention, it being understood that variations may be made without departing from the spirit of the scope of the invention. For example, concept could be implemented in many different operating environments, including, but not limited to, the Macintosh, UNIX, XWindows and MOTIF environments. In addition, the device 24 could be implemented using the Novel TSAPI interface or a specific voice processing board.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. On a personal computer (PC) electrically connected to a telephone line, a method of implementing an automated information retrieval system for retrieving information from remote interactive voice response (IVR) systems, the method comprising the steps of:

creating a definition of a remote IVR service to be accessed by said information retrieval system, wherein said definition of the remote IVR service comprises a service name, a telephone number, and an icon for said service;

creating a definition of an account of said service, wherein said definition of the account comprises specifying an account name, an account ID and an account password;

creating a user written script to control said service, said script comprising:

at least one record for specifying telephone functions to be performed by said information retrieval system;

at least one record for dialing said service, wherein said record for dialing said service derives information from said definition of the service;

at least one record for recording a message from said service; and at least one record to hang up from said service; and executing the telephone functions specified by at least a portion of said script.

2. The method of claim 1 further comprising adding a record to said script.

3. The method of claim 1 wherein said at least one record for specifying telephone functions comprises at least one of:

a wait for dial tone record for causing said information retrieval system to await receipt of a dial tone on said telephone line;

a wait for answer record for causing said information retrieval system to await an off hook condition on said telephone line;

a send account ID record for causing said information retrieval system to transmit an account ID of said account;

a send keys record for causing said information retrieval system to send dual tone multi frequency (DTMF) tones corresponding to keys identified in a data field of said send keys record over said telephone line;

a send text record for sending alphanumeric text identified in said data field of said send text record over said telephone line;

a send password record for sending said account password over said telephone line, wherein said password record cannot be edited by a user and said password record obtains said account password from said definition of the account;

a pause record for pausing execution of said script; and a play to line record for playing the contents of an audio file identified by a filename in a data field of said play to line record over said telephone line.

4. A method of implementing an automated system for retrieving information from interactive voice response (IVR) systems using a personal computer (PC) electrically connected to a telephone line, the method comprising the steps of:

defining a service to be accessed by said information retrieval system, wherein said step of defining a service comprises the steps of:

defining a service name;

defining a service telephone number; and defining a service icon;

defining at least one account of said service;

creating a user written script associated with said service, said script comprising:

at least one record for specifying telephone functions to be performed by said information retrieval system;

at least one record for dialing said service, wherein said record for dialing said service derives information from said definitions of the service;

at least one record for recording a message from said service; and at least one record to hang up from said service; and responsive to user activation of said script, executing the telephone functions specified by at least a portion of said script.

5. The method of claim 4 further comprising editing said script.

6. The method of claim 5 wherein said step of editing said script comprises displaying a first display pane and a second display pane, said first display pane showing said service icon as a selected icon, said second display pane showing at least a portion of said script.

7. The method of claim 5 wherein said step of editing said script comprises deleting records from said script.

8. The method of claim 4 wherein said at least one record for specifying telephone functions comprises at least one of:

a wait for dial tone record for causing said information retrieval system to await receipt of a dial tone on said telephone line;

a wait for answer record for causing said information retrieval system to await an off hook condition on said telephone line;

a send account ID record for causing said information retrieval system to transmit an account ID of said account;

a send keys record for causing said information retrieval system to send dual tone multi frequency (DTMF) tones corresponding to keys identified in a data field of said send keys record over said telephone line;

a send text record for sending alphanumeric text identified in said data field of said record over said telephone line;

a send password record for sending a password associated with said account over said telephone line;

a pause record for pausing execution of said script; and a play to line record for playing the contents of an audio file identified by a filename in a data field of said play to line record over said telephone line.

9. A computer program stored on a computer readable medium for implementing an automated system for retrieving information from interactive voice response systems, said computer program being executed by a personal computer (PC) electrically connected to a telephone line, the computer program comprising:

first instructions for execution by the PC for enabling a user to define a service to be accessed by said information retrieval system, said first instructions comprising instructions for defining a service name, a service telephone number, and a service icon;

second instructions for execution by the PC for enabling the user to define at least one account of said service, said second instructions comprising instructions for defining an account name, an account ID, and a password; and third instructions for execution by the PC for enabling the user to create a user written script associated with said service, said script comprising at least one record for specifying telephone functions to be performed by said information retrieval system, said script configured to automatically retrieve data from said service by dialing said service, recording a message from said service, and hanging up from said service.

10. The computer program of claim 9 further comprising instructions for causing said PC to execute functions defined by said script.

* * * * *